US012585988B2

(12) United States Patent　　　　　　(10) Patent No.:　　US 12,585,988 B2
Furukawa et al.　　　　　　　　　　　　(45) Date of Patent:　　　Mar. 24, 2026

(54) SYSTEMS AND METHODS FOR GENERATING AND APPLYING A SECURE STATISTICAL CLASSIFIER

(71) Applicants: NEC Corporation Of America, Herzlia (IL); Bar-Ilan University, Ramat-Gan (IL); NEC Corporation, Tokyo (JP)

(72) Inventors: Jun Furukawa, Tel-Aviv (IL); Joseph Keshet, Tel-Aviv (IL); Kazuma Ohara, Kawasaki (JP); Toshinori Araki, Kawasaki (JP); Hikaru Tsuchida, Kawasaki (JP); Takuma Amada, Kawasaki (JP); Kazuya Kakizaki, Kawasaki (JP); Shir Aviv-Reuven, Petach-Tikva (IL)

(73) Assignees: NEC Corporation Of America, Herzlia (IL); Bar-Ilan University, Ramat-Gan (IL); NEC Corporation, Tokyo (JP)

( * ) Notice: Subject to any disclaimer, the term of this patent is extended or adjusted under 35 U.S.C. 154(b) by 1003 days.

(21) Appl. No.: 17/683,395

(22) Filed: Mar. 1, 2022

(65) Prior Publication Data

US 2022/0188706 A1　　　Jun. 16, 2022

Related U.S. Application Data

(63) Continuation of application No. 16/353,046, filed on Mar. 14, 2019, now Pat. No. 11,315,037.

(51) Int. Cl.
　　*G06N 20/00*　　　　(2019.01)
　　*G06N 5/048*　　　　(2023.01)

(52) U.S. Cl.
　　CPC .............. *G06N 20/00* (2019.01); *G06N 5/048* (2013.01)

(58) Field of Classification Search
　　CPC ........ G06N 20/00; G06N 5/048; G06N 3/045; G06N 3/08
　　See application file for complete search history.

(56) References Cited

U.S. PATENT DOCUMENTS

| | | | |
|---|---|---|---|
| 7,873,583 B2 | 1/2011 | Laxman et al. | |
| 10,891,374 B1* | 1/2021 | Curtin | ................... G06N 20/20 |

(Continued)

OTHER PUBLICATIONS

Notice of Allowance Dated Feb. 7, 2022 together with Interview Summary Dated Jan. 21, 2022 from US Patent and Trademark Office Re. U.S. Appl. No. 16/353,046. (8 pages).

(Continued)

*Primary Examiner* — Reji Kartholy

(57)　　　　　　　　ABSTRACT

There is provided a system for computing a secure statistical classifier, comprising: at least one hardware processor executing a code for: accessing code instructions of an untrained statistical classifier, accessing a training dataset, accessing a plurality of cryptographic keys, creating a plurality of instances of the untrained statistical classifier, creating a plurality of trained sub-classifiers by training each of the plurality of instances of the untrained statistical classifier by iteratively adjusting adjustable classification parameters of the respective instance of the untrained statistical classifier according to a portion of the training data serving as input and a corresponding ground truth label, and at least one unique cryptographic key of the plurality of cryptographic keys, wherein the adjustable classification parameters of each trained sub-classifier have unique values computed according to corresponding at least one unique cryptographic key, and providing the statistical classifier, wherein the statistical classifier includes the plurality of trained sub-classifiers.

20 Claims, 5 Drawing Sheets

(56)                  References Cited

U.S. PATENT DOCUMENTS

| | | | | |
|---|---|---|---|---|
| 11,888,997 | B1 * | 1/2024 | Bowen | H04L 9/3247 |
| 2008/0177684 | A1 * | 7/2008 | Laxman | G06N 20/10 |
| | | | | 706/20 |
| 2014/0337937 | A1 | 11/2014 | Truskovsky et al. | |
| 2015/0102216 | A1 * | 4/2015 | Roder | G06V 20/698 |
| | | | | 250/281 |
| 2018/0294975 | A1 * | 10/2018 | Woods | G06F 21/577 |
| 2019/0068362 | A1 * | 2/2019 | Anderson | G06N 5/025 |
| 2019/0102674 | A1 | 4/2019 | Kwant et al. | |
| 2019/0245866 | A1 * | 8/2019 | Anderson | H04L 63/166 |
| 2019/0370634 | A1 | 12/2019 | Ferreira Moreno et al. | |
| 2020/0007512 | A1 * | 1/2020 | Kirat | H04L 9/0861 |
| 2020/0019867 | A1 * | 1/2020 | Nandakumar | G06N 3/048 |
| 2020/0293944 | A1 | 9/2020 | Furukawa et al. | |
| 2021/0144455 | A1 * | 5/2021 | Anderson | H04L 63/1441 |

OTHER PUBLICATIONS

Official Action Dated Oct. 28, 2021 from the US Patent and
Trademark Office Re. U.S. Appl. No. 16/353,046. (29 pages).
Hsu "An Explorer of Things", Rule Based Classification, 8 Pages,
Mar. 21, 2017.
Ilyas ct al. "Black-Box Adversarial Attacks With Limited Queries
and Information", Proceedings of the 35th International Conference
on Machine Learning, Stockholm, Sweden, Jul. 10-15, 2018, PMLR
80: 2137-2146, Jul. 10, 2018.

* cited by examiner

100

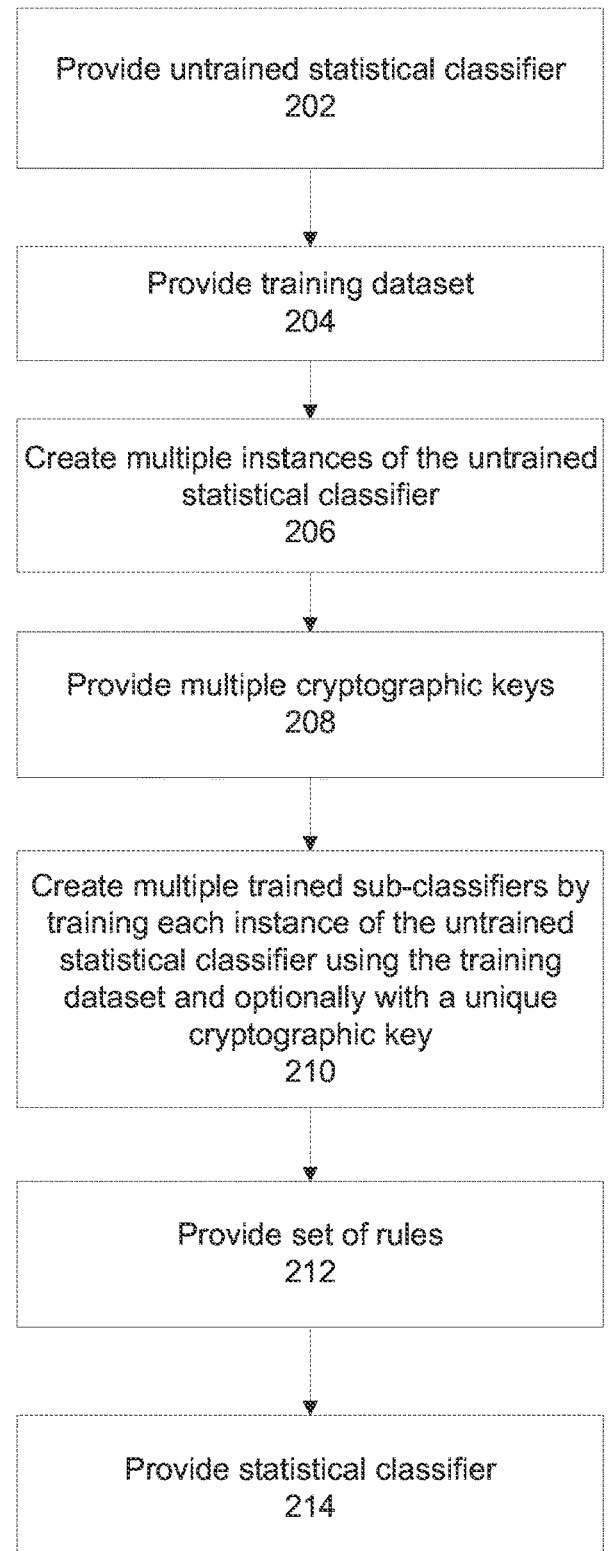

Provide untrained statistical classifier
202

Provide training dataset
204

Create multiple instances of the untrained statistical classifier
206

Provide multiple cryptographic keys
208

Create multiple trained sub-classifiers by training each instance of the untrained statistical classifier using the training dataset and optionally with a unique cryptographic key
210

Provide set of rules
212

Provide statistical classifier
214

FIG. 2

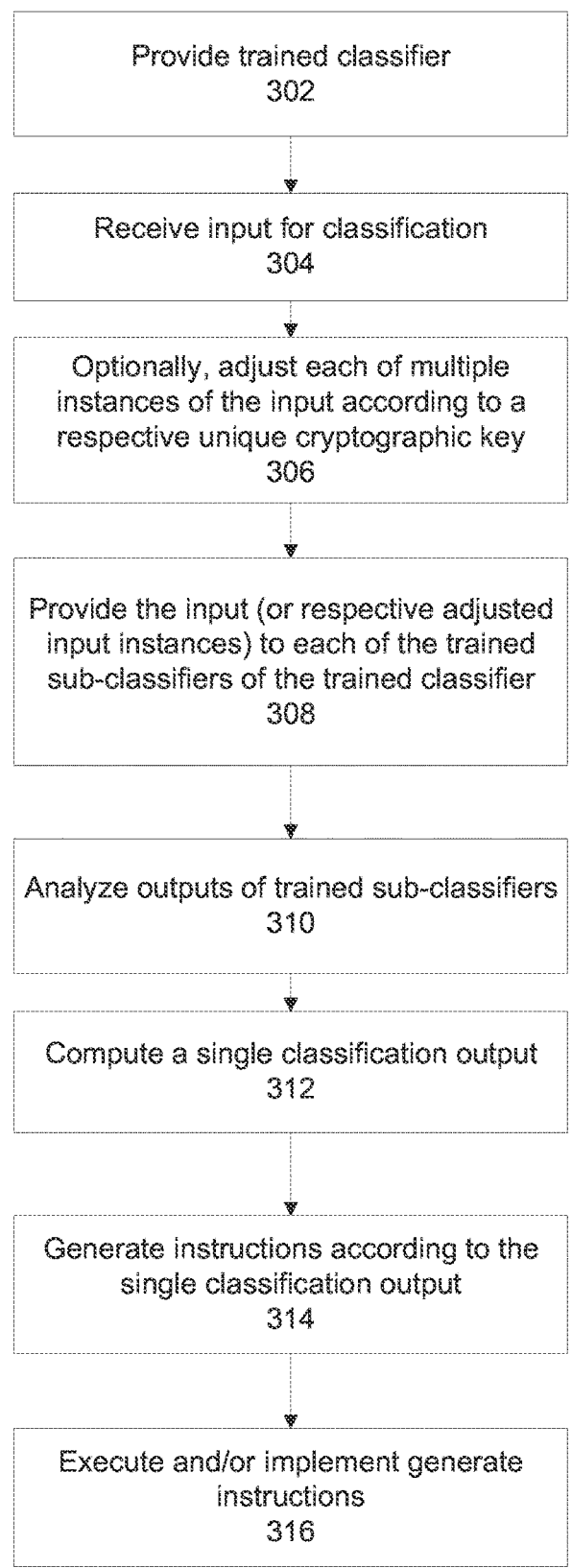

Provide trained classifier
302

Receive input for classification
304

Optionally, adjust each of multiple
instances of the input according to a
respective unique cryptographic key
306

Provide the input (or respective adjusted
input instances) to each of the trained
sub-classifiers of the trained classifier
308

Analyze outputs of trained sub-classifiers
310

Compute a single classification output
312

Generate instructions according to the
single classification output
314

Execute and/or implement generate
instructions
316

FIG. 3

SYSTEMS AND METHODS FOR GENERATING AND APPLYING A SECURE STATISTICAL CLASSIFIER

RELATED APPLICATION

This application is a continuation of U.S. patent application Ser. No. 16/353,046 filed on Mar. 14, 2019, the contents of which are incorporated herein by reference in their entirety.

BACKGROUND

The present invention, in some embodiments thereof, relates to machine learning and, more specifically, but not exclusively, to cybersecurity for classifiers.

A classifier based on machine learning processes is trained with a set of labeled data. The trained classifier assigns a classification label to a new data item.

SUMMARY

According to a first aspect, a system for computing a secure statistical classifier, comprises: at least one hardware processor executing a code for: accessing code instructions of an untrained statistical classifier, accessing a training dataset, accessing a plurality of cryptographic keys, creating a plurality of instances of the untrained statistical classifier, creating a plurality of trained sub-classifiers by training each of the plurality of instances of the untrained statistical classifier by iteratively adjusting adjustable classification parameters of the respective instance of the untrained statistical classifier according to a portion of the training data serving as input and a corresponding ground truth label, and at least one unique cryptographic key of the plurality of cryptographic keys, wherein the adjustable classification parameters of each trained sub-classifier have unique values computed according to corresponding at least one unique cryptographic key, and providing the statistical classifier, wherein the statistical classifier includes the plurality of trained sub-classifiers.

According to a second aspect, a system for secure classification of input, comprises: at least one hardware processor executing a code for: receiving input for classification by a statistical classifier, providing the input to each of a plurality of trained sub-classifiers, wherein each of the plurality of trained sub-classifiers includes a respective instance of an untrained statistical classifier trained by iteratively adjusting adjustable classification parameters of the respective instance of the untrained statistical classifier according to a portion of a training data serving as input and a corresponding ground truth label, and at least one unique cryptographic key of a plurality of unique cryptographic keys, wherein the adjustable classification parameters of each trained sub-classifier have unique values computed according to corresponding at least one unique cryptographic key, and computing a single classification output in response to the plurality of classification outputs from the plurality of trained sub-classifiers.

According to a third aspect, a system for computing a secure statistical classifier, comprises: at least one hardware processor executing a code for: accessing code instructions of an untrained statistical classifier, accessing a training dataset, accessing a plurality of cryptographic keys, creating a plurality of instances of the untrained statistical classifier, creating a plurality of trained sub-classifiers by training each of the plurality of instances of the untrained statistical classifier using the training dataset, and providing the statistical classifier, wherein the statistical classifier includes the plurality of trained sub-classifiers and code for computing a plurality of instances of a new data item for classification, adjusting each of the plurality of instances according to a respective at least one unique cryptographic key of the plurality of cryptographic keys to compute a plurality of adjusted instances of the new data item, inputting each adjusted instance into a respective sub-classifier, and analyzing the plurality of outputs of the sub-classifiers to compute a single classification outcome.

In a further implementation form of the first, second, and third aspects, a probability of computing a misclassification by the statistical classifier in response to an input is statistically lower than a probability of computing a misclassification by a single untrained statistical classifier trained with the training dataset and without a cryptographic key.

In a further implementation form of the first, second, and third aspects, each respective cryptographic key comprises random data generated such that a probability of randomly computing the respective cryptographic key is below a set threshold.

In a further implementation form of the first, and second aspects, the untrained statistical classifier comprises a neural network, and wherein weights computed for each respective trained sub-classifier using the training dataset vary according to respective at least one unique cryptographic key.

In a further implementation form of the first, second, and third aspects, the cryptographic keys are stored in a secure data storage device that denies access to non-authorized users, wherein the non-authorized users are granted access for providing input to the statistical classifier.

In a further implementation form of the first, and second aspects, the untrained statistical classifier comprises a neural network, wherein each of the plurality of instances of the untrained statistical classifier is iteratively trained by a unique adjustment of weights according to the training dataset and the respective at least one unique cryptographic key.

In a further implementation form of the first, and second aspects, the system further comprises code for training each of the plurality of instances of the untrained statistical classifier to generate a respective sub-classifier by updating an initial set of adjustable classification parameters, including instructions for iterating the following for updating the initial set of adjustable classification parameters until a stop condition is met: computing a loss value as a difference between ground truth and a classification output of the respective sub-classifier in response to an input of a portion of the training dataset, wherein the adjustable classification parameters of the respective sub-classifier are stored as a parameter vector, computing a direction vector indicative of most loss of the loss value when the parameter vector shifts in the direction of the direction vector, computing a biased direction vector storing a biased update to the adjustable classification parameters as a function of the direction vector and the respective cryptographic key provided to the respective instance of the untrained statistical classifier, and computing an adjusted parameter vector by adding to the current parameter vector, the biased direction vector in view of a defined learning rate multiplied by the biased update to adjustable classification parameters.

In a further implementation form of the first, and second aspects, the biased update to the adjustable parameter is computed as the function of the direction vector and the respective cryptographic key by computing a strong sub-set of the respective cryptographic key according to a strong requirement, and computing a weak sub-set of the respective cryptographic key according to a weak requirement.

In a further implementation form of the first, and second aspects, the respective cryptographic key is converted into a string of bits, the strong sub-set includes indices of the string of bits having a value of 1, and the weak sub-set includes indices of the string of bits having a value of 0.

In a further implementation form of the first, and second aspects, the cryptographic key denotes a two dimensional matrix, where the size of each of the two dimensions is according to a size of the direction vector and the parameter vector, wherein an inner product of the parameter vector and the two dimensional vector is positive, and the value of the multiplication of the parameter vector and the two dimensional vector is less than the Euclidean norm of the parameter vector, wherein the biased direction vector is computed as a product of the two dimensional matrix and the direction vector.

In a further implementation form of the first, and second aspects, the system further comprises code for training each of the plurality of instances of the untrained statistical classifier to generate a respective sub-classifier by updating an initial set of adjustable classification parameters, including instructions for iterating the following for updating the initial set of adjustable classification parameters until a condition is met, wherein an initial value of a condition function computed according to the respective cryptographic key and the parameter vector is equal to zero: computing a loss value as a difference between ground truth and a classification output of the respective sub-classifier in response to an input of a portion of the training dataset, wherein the adjustable classification parameters of the respective sub-classifier are stored as a parameter vector, computing a direction vector storing a biased update to the adjustable classification parameters indicative of most loss of the loss value when the parameter vector shifts in the direction of the direction vector on the condition that the condition function computed according to the respective cryptographic key and the parameter vector added to the direction vector in view of a defined learning rate is equal to zero, and computing an adjusted parameter vector by adding to the current parameter vector, the direction vector in view of a defined learning rate multiplied by the biased update to adjustable classification parameters.

In a further implementation form of the first, and second aspects, the condition function is equal to zero when a certain indexed value of the parameter vector is equal to zero, wherein the certain indexed value of the parameter vector is equal to zero when the index is found in a subset of indices of the cryptographic key.

In a further implementation form of the first, and second aspects, the cryptographic key denotes a two dimensional matrix, where the size of each of the two dimensions is according to a size of the direction vector and the parameter vector, and the cryptographic key denotes a condition vector having a size according to the size of the direction vector and the parameter vector, wherein a product of the two dimensional matrix and the parameter vector is equal to the condition vector when the condition function computed according to the respective cryptographic key and the parameter vector is equal to zero.

In a further implementation form of the first, second, and third aspects, the system further comprises code for generating code instructions for execution by a controller according to the single classification output, wherein the controller is for control of at least one member of the group consisting of: an automated driving vehicle, a semi-automated driving vehicle, and a security system.

In a further implementation form of the first, second, and third aspects, the statistical classifier further includes a set of rules defining a single classification output of the statistical classifier in response to a plurality of classification outputs from the plurality of trained sub-classifiers in response to input into the statistical classifier that is provided to each of the plurality of trained sub-classifiers, wherein the single classification output is computed according to the set of rules.

In a further implementation form of the first, second, and third aspects, the set of rules define selection of the single classification output according to a majority of plurality of classification outputs from the plurality of trained sub-classifiers.

In a further implementation form of the first, second, and third aspects, an indication of a degree of certainty of correct classification of the respective classification output is outputted by each respective trained sub-classifier, and the set of rules define outputting an indication of likelihood of malicious manipulation when a distribution of the degrees of certainty outputted by the plurality of trained sub-classifiers is according to a requirement.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 is a flowchart of a method for training a secure statistical classifier, in accordance with some embodiments of the present invention;

FIG. 3 is a flowchart of a method for classifying an input data by a trained secure classifier, in accordance with some embodiments of the present invention;

DETAILED DESCRIPTION

Figure 1:
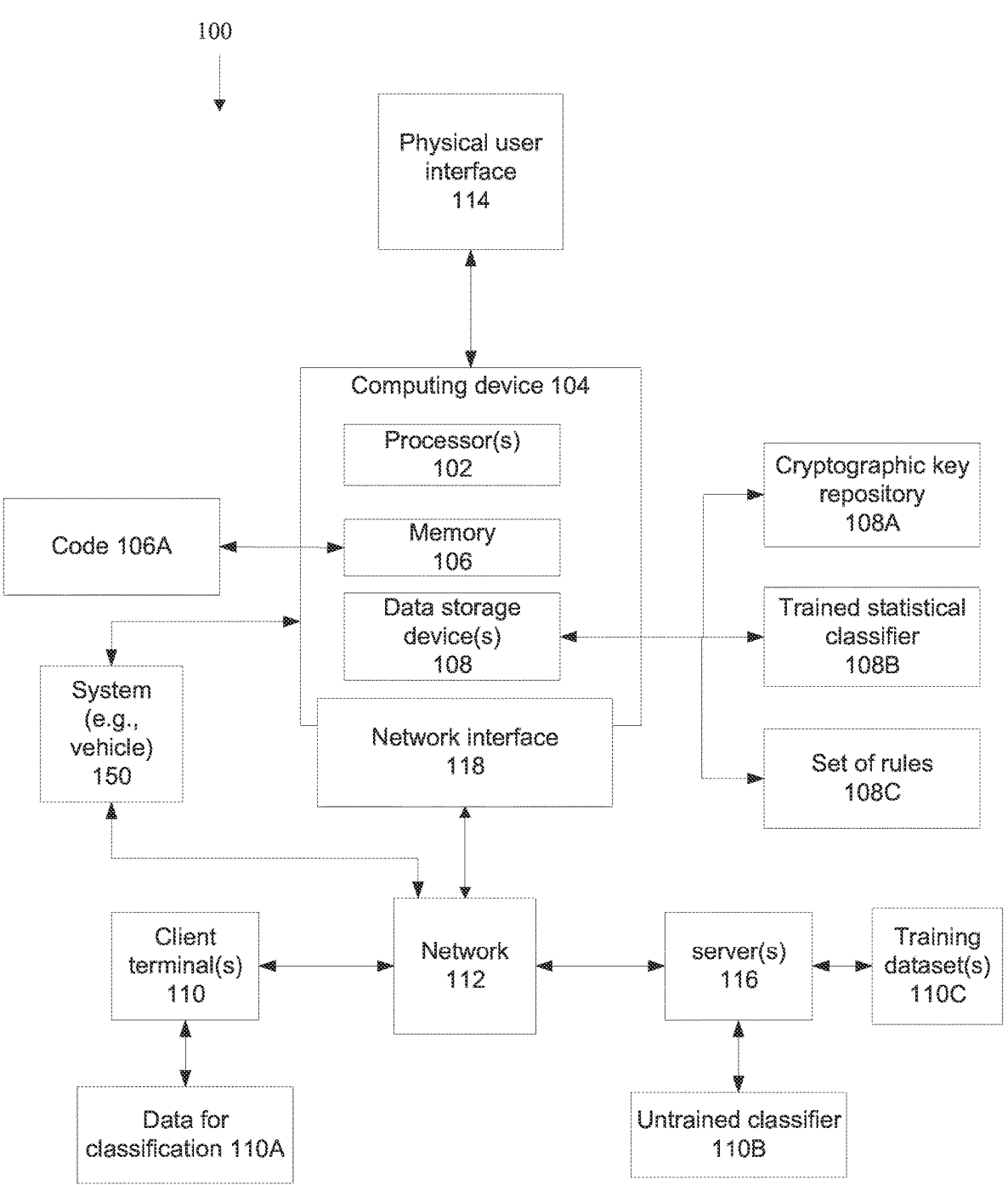
FIG. 1 is a is a block diagram of components of a system for computing a statistical classifier and/or for classifying data by the statistical classifier, where the statistical classifier includes multiple instances of an untrained classifier each trained using a common training dataset and optionally a respective unique cryptographic key, in accordance with some embodiments of the present invention.

The present invention, in some embodiments thereof, relates to machine learning and, more specifically, but not exclusively, to cybersecurity for classifiers.

As used herein, the terms secure classifier, secure statistical classifier, classifier, and statistical classifier are interchangeable.

An aspect of some embodiments of the present invention relates to a system, a method, an apparatus, and/or code instructions (stored on a memory and executable by one or more hardware processors) for computing a secure statistical classifier. The statistical classifier is secured, for example, against malicious manipulation by a malicious entity that provides fabricated data in an attempt to force a desired output by a misclassification of the classifier. The probability of the secure statistical classifier incorrectly misclassifying data, optionally fabricated data, is significantly reduced in comparison to a standard statistical classifier that is likely to misclassify the data, optionally the fabricated data. Fabricated data which is designed to be incorrectly classified by a standard classifier, is likely to be correctly classified by the secure classifier described herein, and/or likely to be identified as fabricated data (also referred to herein as forgery) by the secure classifier. It is noted that the fabricated data may be correctly classified by a human observer. For example, an image of a cat is manually manipulated by a malicious entity using software with the goal of being incorrectly classified by a standard classifier as a dog. The secure classifier described herein correctly classifies the manipulated cat image as cat, or outputs an indication that the manipulated cat image is a forgery and does not represent a real cat. It is noted that the secure classifier is secured against classification errors (also referred to herein as misclassification) that arise from other inputs which may not necessarily be fabricated with malicious intent, for example, distorted and/or blurred images created due to camera focusing errors and/or due to dirt on the lens of the camera. In another example, the classifier is secured against classification errors that arise from input which is not represented in the training data and/or not sufficiently represented in the training data. For example, classification of an image of a new species of bird that does not appear in the training data.

Code for an untrained statistical classifier, and a training dataset including labeled data, are obtained. Multiple trained sub-classifiers are computed by training instances of the untrained statistical classifier according to the training dataset and one or more unique cryptographic keys. Each of the instances of the untrained statistical classifier is trained by iteratively adjusting adjustable classification parameters of the respective instance of the untrained statistical classifier according to a portion of the training data serving as input and a corresponding ground truth label, and the at least one unique cryptographic key corresponding to the respective instance of the untrained statistical classifier. In one example, when the untrained statistical classifier is a neural network, the adjustable classification parameters are weights of neurons that are iteratively adjusted to minimize a loss function. The value of the adjustable classification parameters is further adjusted based on the cryptographic key(s). Each set of adjustable classification parameters of each trained statistical classifier has unique values, computed according to the corresponding unique cryptographic key(s), even in the case of the using the same training data. Each cryptographic key is implemented as, for example, a string. The cryptographic keys are generated, for example, randomly. The length of the string may be selected to be sufficiently long such that the probability of randomly computing the respective cryptographic key using realistically available computational sources is sufficiently low (e.g., below a threshold) and/or such that the expected time to randomly compute the same cryptographic key using the computational resources is exceedingly long (e.g., above a threshold). The output of the sub-classifiers is analyzed, for example by a set of rules, to generate a single output by the classifier. The statistical classifier includes the trained sub-classifiers.

When a target data is inputted into the classifier for classification, each sub-classifier may output a different result and/or have a different associated confidence level, since each sub-classifier has different values for is respective adjustable classification parameters due to training using unique cryptographic key(s). The outputs of the sub-classifier are analyzed to determine the resulting classification, for example, by a majority vote. Misclassifications by individual sub-classifiers are not propagated to the final outcome, securing the classifier against misclassification. Fabricated data may be identified, for example, when the confidence levels of the multiple sub-classifiers vary widely.

An aspect of some embodiments of the present invention relates to a system, a method, an apparatus, and/or code instructions (stored on a memory and executable by one or more hardware processors) for computing a secure statistical classifier. The statistical classifier is secured against malicious manipulation by a malicious entity that provides fabricated data in an attempt to force a desired output by a misclassification of the classifier. Code for an untrained statistical classifier, and a training dataset including labeled data, are obtained. Multiple trained sub-classifiers are computed by training instances of the untrained statistical classifier according to the training dataset, and optionally one or more unique cryptographic keys. The statistical classifier includes the trained sub-classifiers and code for computing multiple instances of a new received data item for classification, for adjusting each of the data item instances according to a respective unique cryptographic key. Each adjusted instance is inputted into a respective sub-classifier. The classification outputs and/or confidence levels outputted by the sub-classifiers are analyzed to compute a single classification outcome.

Optionally, the statistical classifier, and the trained sub-classifiers are non-deterministic.

Optionally, the statistical classifier includes a set of rules defining a single classification output of the statistical classifier in response to classification outputs from the multiple trained sub-classifiers in response to input into the statistical classifier that is provided to each of the trained sub-classifiers. For example, the set of rules define a majority vote, where the single classification output is based on a majority output of the multiple trained sub-classifiers. In another example, the set of rules define a distribution of confidence levels outputted by the multiple trained sub-classifiers indicative of fabricated input.

Optionally, a probability of computing a misclassification (i.e., classification error) by the statistical classifier in response to an input is statistically lower than a probability of computing a misclassification by a single untrained statistical classifier trained with the training dataset and without a cryptographic key.

An aspect of some embodiments of the present invention relates to a system, a method, an apparatus, and/or code instructions for secure classification by a statistical classifier. The statistical classifier is resistant and/or less prone to malicious manipulation, such as an attempt to force a classification result by feeding fabricated input into the classifier. Likelihood of classification errors is reduced in comparison to classification by a standard classifier. Input is received for classification by the secure statistical classifier. The input is fed into each of multiple trained sub-classifiers. Each of the trained sub-classifiers includes a respective instance of an untrained statistical classifier, trained by iteratively adjusting adjustable classification parameters according to a portion of a training data serving as input and a corresponding ground truth label, and unique cryptographic key(s). Each trained sub-classifier outputs a respective classification output. A single classification output is computed according to an analysis of the multiple classification outputs by the multiple trained sub-classifiers, optionally according to a set of rules.

An aspect of some embodiments of the present invention relates to a system, a method, an apparatus, and/or code instructions for secure classification by a statistical classifier, optionally in terms of reduced likelihood of misclassification of data (optionally fabricated data) in comparison to classification by a standard classifier. The secure statistical classifier is resistant and/or less prone to malicious manipulation, such as an attempt to force a classification result by feeding fabricated input into the classifier. Input is received for classification by the statistical classifier. Multiple instances of the input are compute. Each input instance is adjusted according to a respective unique cryptographic key. Each input instance is fed into a respective trained sub-classifier the multiple trained sub-classifiers of the statistical classifier. Each of the multiple trained sub-classifiers is trained according to a training dataset and optionally one or more unique cryptographic keys. Each trained sub-classifier outputs a respective classification output. A single classification output is computed according to an analysis of the multiple classification outputs by the multiple trained sub-classifiers, optionally according to a set of rules.

Optionally, instructions are generated according to the single classification output of the secure classifier. The instructions may be manual instructions for execution by a user, and/or code instructions for automated execution by one or more hardware processors, for example, a controller of an automated vehicle, a robot, and a security system. The statistical classifier, which is designed to be secure against malicious attacks, improves security of malicious attack on the automated system (e.g., vehicle, robot, security system).

At least some implementations of the systems, methods, apparatus, and/or code instructions described herein improve technology of statistical classifiers and/or machine learning processes by computing classifiers less resistant to classification errors and/or more secure classifiers. The training process described herein computes a statistical classifier that is resistance to misclassification of maliciously generated data (also referred to as fabricated data) and/or resistant to incorrect classification of data which is not necessarily fabricated for malicious intent (e.g., non-focused images due to errors in the focusing mechanism of the camera). The maliciously generated data is designed to obtain a desired classification output by the classifier, which is considered erroneous in the sense that the designed classification output should not be classified at all by the classifier (i.e., indicative of faulty data) or should be classified to a different value. In another example, the data being classified does not appear in the training dataset, for example, due to distortion by imperfections in the lens and/or an image containing a new object that does not appear in the training dataset. Such maliciously generated data (and/or distorted data) may be fed into a classifier that controls a system, with malicious intent to modify the system, for example, to control an automated vehicle, to control a security system, and/or to provide an indication of authenticity for forged objects (e.g., art, currency, components). For example, an automated driving vehicle is maliciously fed an image that may look like noise rather than an expected scene of a road with the malicious attempt to control the vehicle to perform a malicious act. In another example, a forgery of an expensive painting is made with an attempt to obtain an indication of authenticity from a classifier that automatically analyzes paintings to detect forgeries.

In a typical supervised training process, an untrained statistical classifier (e.g., neural network) starts with an initial parameter and/or set of parameters, mathematically denoted herein as V. V is sometimes referred to herein as adjustable classification parameters. V may be implemented as a vector of values. For example, initial weights of an untrained neural network. The untrained statistical classifier is provided with a training set (denoted T). Training is performed by iteratively updating V, usually a small update of V for each iteration cycle. In each iterative small update of V, the statistical classifier uses a portion of T and computes how V should be updated in order to get V closer to its ideal values, for example, according to a loss function for a neural network. By repeatedly moving V toward its ideal value, the goal of the training is to computed a final V that may be used to compute a classification category and/or label for a new data item (also referred to as inference), which may be a previously unobserved data item (i.e., not appearing in the training dataset). At least some implementations of the systems, methods, apparatus, and/or code instructions described herein improve upon the standard training process described herein by training multiple instances of the untrained statistical classifier using a respective unique cryptographic key, denoted K. The cryptographic key affects the iterative updating of V during the training process. For example, K may shift the updating of V (e.g., shift the resulting vector computed for the update) and/or may restrict the domain of V. Multiple sub-classifiers are created from the training of the multiple instances of the untrained statistical classifiers, the training dataset, and the cryptographic keys. The outputs of the multiple trained sub-classifiers in response to a new data item are aggregated to compute a single classification output, for example, based on a majority vote. Since each statistical sub-classifier is trained using a different cryptographic key, the values of V are different for each trained classifier, even when the same training dataset is used, resulting in different outputs by the sub-classifiers in response to the same input. Since either the final V depends on K or inference depends on K, the adversary and/or malicious entity who does not know K is not able to simulate exactly what the inferences of the trained classifier will be based on the input the adversary and/or malicious entity generated. Because of this uncertainty, when the statistical classifier includes multiple trained sub-classifiers, each trained with a different cryptographic key, each sub-classifier responses computes a different output to the same input the adversary maliciously generated, while all sub-classifiers tend to respond in the same manner if the input is not malicious, since all sub-classifiers are trained with non malicious test data. The malicious input may be detected and/or excluded by comparing the outputs of the sub-classifiers.

It is noted that for the training methods based on the cryptographic keys, the statistical classifier learns the optimal values of the adjustable classification parameters for accurate classification of new data items. Although in some implementations, the classification parameter may not necessarily be modified in the most direct manner towards its optimal values, the values of the classification parameter at each iteration may arrive closer at the optimal values. At least in some implementations, the trained sub-classifiers learn the optimal values of the adjustable parameters even when affected by the cryptographic keys (in comparison to training without the cryptographic keys), although a larger number of training iteration cycles may be required (in comparison to training without the cryptographic keys). As such, at least some implementations of the systems, methods, apparatus, and/or code instructions described herein do not deteriorate the sub-classifier's capability of inference, for example, in terms of accuracy (in comparison to training without the cryptographic keys).

At least some implementations of the systems, methods, apparatus, and/or code instructions described herein address the technical problem of cybersecurity, in particular, malicious attacks on a system based on classification of input data such as queries (e.g., images, other data). Standard machine learning processes train a statistical classifier with training data. Such statistical classifiers, trained using conventional processes, are prone to malicious attack. Such attackers figure out a way to generate an incorrect but desired classification result by the classifiers when specially selected input data is provided. The input data may be correctly classified by a human, but incorrectly classified by the classifier. When such classifiers are integrated within systems, the system may be maliciously manipulated. For example, automated driving systems, environmental monitoring systems, and system for detecting forged objects, may be maliciously manipulated by generation of malicious data. Additional details of the technical problem are described, for example with reference to Andrew Ilyas, Logan Engstrom, Anish Athalye, Jessy Lin: *Black-box Adversarial Attacks with Limited Queries and Information, ICML* 2018: 2142-2151. At least some implementations of the systems, methods, apparatus, and/or code instructions described herein provide a technical solution to the technical problem, by training a classifier that has a relatively high accuracy of correct classification so that malicious manipulation of the classifier designed to output incorrect classification results is reduced or statistically eliminated.

At least some implementations of the systems, methods, apparatus, and/or code instructions described herein improve the technical field of cybersecurity, by increasing security of systems based on trained classifiers that classify input data (e.g., images) against malicious manipulation, in which a malicious entity provides input data selected to generate an incorrect classification result by the classifier. Such systems include, for example, autonomous vehicles, automated driving assistance systems, monitoring systems, and forgery detection systems. The accuracy of the classifier is statistically increased such that input data that generates an incorrect classification result is difficult or impossible to compute and/or create.

At least some implementations of the systems, methods, apparatus, and/or code instructions described herein improve the technical field of machine learning, in particular statistical classifiers, by statistically significantly increasing the accuracy of a trained statistical classifier in correctly classifying input data in comparison to a conventional statistical classifier trained using conventional methods using a training dataset. The accuracy of the classifier may be increased for data items which do not appear in the training dataset. At least some implementations of the systems, methods, apparatus, and/or code instructions described herein create the statistical classifier with higher classification accuracy from an untrained conventional statistical classifier and a conventional training dataset. Conceptually, the untrained conventional statistical classifier and the conventional training dataset are used to create the statistical classifier with higher classification accuracy in comparison to a statistical classifier that would otherwise be created when the untrained conventional statistical classifier is trained using the conventional training dataset using conventional processes.

The problem addressed by at least some implementations of the systems, methods, apparatus, and/or code instructions described herein is new, and specific for the technological context of statistical classifiers. The problem of improving security of statistical classifiers against malicious manipulation, and/or increasing the accuracy of statistical classifiers (in particular against fabricated input data) is new, and only arose now due to the technology of statistical classifiers, and therefore, does not have a counterpart in the old physical world.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a block diagram of components of a system 100 for computing a statistical classifier 108B and/or for classifying data by the statistical classifier 108B, where the statistical classifier 108B includes multiple instances of an untrained classifier 110B each trained using a training dataset 110C and a optionally a respective unique cryptographic key 108A, in accordance with some embodiments of the present invention. Reference is also made to FIG. 2 which is a flowchart of a method for training a secure statistical classifier, in accordance with some embodiments of the present invention. Reference is also made to FIG. 3, which is a flowchart of a method for classifying an input data by a trained secure classifier, in accordance with some embodiments of the present invention. System 100 may implement the acts of the methods described with reference to FIGS. 2-3, by processor(s) 102 of a computing device 104 executing code instructions (e.g., code 106A) stored in a memory 106 (also referred to as a program store).

Computing device 104 may be implemented as, for example one or more and/or combination of: a group of connected devices, a client terminal, a server, a virtual server, a computing cloud, a virtual machine, a desktop computer, a thin client, a network node, a network server, and/or a mobile device (e.g., a Smartphone, a Tablet computer, a laptop computer, a wearable computer, glasses computer, and a watch computer).

Different architectures of system 100 may be implemented, for example:

Computing device 104 may be implemented as one or more servers (e.g., network server, web server, a computing cloud, a virtual server, a network node) that provides services to multiple client terminals 110 over a network 112, for example, software as a service (SaaS), and/or other remote services.

Communication between client terminal(s) 110 and computing device 104 over network 112 may be implemented, for example, via an application programming interface (API), software development kit (SDK), functions and/or libraries and/or add-ons added to existing applications executing on client terminal(s), an application for download and execution on client terminal 110 that communicates with computing device 104, function and/or interface calls to code executed by computing device 104, a remote access section executing on a web site hosted by computing device 104 accessed via a web browser executing on client terminal(s) 110.

Computing device 104 may be implemented as a stand-alone device (e.g., vehicle, sensor, kiosk, client terminal, smartphone, server, computing cloud, virtual machine) that includes locally stored code that implement one or more of the acts described with reference to FIGS. 2-3. For example, computing device 104 may be implemented as a component of system 150 (and/or integrated within system) 150, for example, a vehicle, a monitoring sensor, an automated lock that opens a door according to biometric data (e.g., image of face, finger print scan, voice recording) and an object forgery detection device. In such implementations, connection to one or more of the following may be optional: network 112, client terminal 110, and/or server(s) 116.

Data for classification 110A, and/or untrained classifier 110B, and/or training dataset 110C may be stored at, for example, client terminal(s) 110, server(s) 116, and/or computing device 104. For example, server(s) may provide untrained classifier 110B and training dataset 110C to computing device 104 for computing trained classifier 108B, as described herein.

Trained classifier 108B may be stored by computing device and/or server(s) 116 and/or client terminal(s) 110 and/or system 150.

Data for classification 110A by trained statistical classifier 108B may be provided by, for example, system 150 and/or client terminal 110 and/or server 116.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-3 when executed by hardware processor(s) 102.

Computing device 104 may include data storage device(s) 108 for storing data, for example, cryptographic key repository 108A for storing cryptographic keys, code instructions of trained statistical classifier 108B, and/or code instructions for the set of rules 108C (used by the trained classifier, as described herein), and/or training dataset(s) 110C. Data storage device(s) 108 may be implemented as, for example, a memory, a local hard-drive, virtual storage, a removable storage unit, an optical disk, a storage device, and/or as a remote server and/or computing cloud (e.g., accessed using a network connection).

Cryptographic key repository 108A may be stored in a secure data storage device 108, as described herein.

Network 112 may be implemented as, for example, the internet, a local area network, a virtual network, a wireless network, a cellular network, a local bus, a point to point link (e.g., wired), and/or combinations of the aforementioned.

Computing device 104 may include a network interface 118 for connecting to network 112, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 and/or client terminal(s) 110 and/or server(s) 116 and/or system 150 include and/or are in communication with one or more physical user interfaces 114 that include a mechanism for user interaction, for example, to provide and/or designate the data for classification and/or untrained classifier and/or training dataset, and/or for viewing the output of the trained statistical classifier. Exemplary physical user interfaces 114 include, for example, one or more of, a touchscreen, a display, gesture activation devices, a keyboard, a mouse, and voice activated software using speakers and microphone.

Client terminal(s) 110 and/or server(s) 116 may be implemented as, for example, as a desktop computer, a server, a virtual server, a network server, a web server, a virtual machine, a thin client, and a mobile device.

Exemplary systems 150 include: a vehicle (e.g., autonomous vehicle), a component of a vehicle (e.g., camera components of an automated driving assistance system), a monitoring sensor, and an object forgery detection device.

Referring now back to FIG. 2, at 202, code instructions of an untrained statistical classifier is provided and/or accessed. The untrained statistical classifier may be implemented as a non-deterministic classifier. The untrained statistical classifier may be, for example, code of an untrained neural network having an initial set of values for weights.

At 204, a training dataset for training the untrained classifier is provided and/or accessed. The training dataset includes labeled data elements, for example, data elements (i.e., a portion of the training dataset serving as input into the untrained classifier) and associated ground truth labels. Exemplary data elements include: images, a representation of speech and/or voice (e.g., digital representation, and/or analogue representation), natural language (e.g., stored as text), and a program (e.g., stored as, for example, source code, script, human readable text, binary format, and compiled code). Examples of training dataset include: images of a scene of a road and associated text labels of objects appearing in the scene (e.g., cars, pedestrians, street signs), images of surveillance images of a property and associated labels indicating whether the image is associated with suspicious activity or not, speech recordings of different people saying their names and a label indicating of validated access or not, natural language extracted from roadside images and a label indicating whether the driver is interested in the topic or not (e.g., restaurant, gas station, hardware store), text extracted from profiles posted on a social network and associated label indicating of whether the poster associated with the text is a suspected terrorist or not, and program code and an associated label indicating whether the program code is malicious or not.

At 206, multiple instances of the untrained statistical classifier are created. Each instance may be created, for example, by copying the code of the untrained classifier into a unique memory location. The number of instances of the untrained statistical classifier may be selected, for example, according to desired classification error requirement and/or desired security level requirement. A greater number of instances provide a smaller classification error and/or higher security level. However, since each instance requires computational resources (e.g., processor and/or memory), the number of instances may be limited by available computational resources and/or a processing time requirement.

At 208, multiple cryptographic keys may be provided and/or accessed and/or computed. The number of cryptographic keys is at least equal to the number of created instances of the untrained statistical classifier. Each instance of the untrained statistical classifier is provided with at least one unique cryptographic key.

Optionally, each cryptographic key is generated as a number and/or string (e.g., of one or more of: numbers, letters, symbols, and/or other characters).

The cryptographic keys may be generated, for example, by a random generation process, and/or based on a cryptographic process such as a hash of a data input such as randomly generated data.

The cryptographic keys may be generated according to an entropy requirement.

The cryptographic keys may be generated to have a size and/or length greater than predefined length.

The cryptographic keys may be generated to have a size and/or length greater than a security parameter. The security parameter may be a integer k such that it is infeasible by a assumed computational resource to do an iteration of an even simple computation $2^k$ times.

The cryptographic key may be computed such that a probability of another entity computing the same cryptographic key value is insignificant (e.g., below a threshold). For example, expected to take a very long time using commonly available computational resources, and/or requiring a larger than available amount of computational resources.

Optionally, the cryptographic keys are stored in a secure data storage device, for example, secured with credentials and/or stored offline. The cryptographic keys may secured against being accessed by a malicious entity that attempts to maliciously manipulate the statistical classifier. The secure data storage may deny access to non-authorized users. The non-authorized users may be granted access for providing input to the statistical classifier (i.e., for using the trained statistical classifier to perform classification).

It is noted that act 208 may not necessarily be implemented for training, for example, in implementations in which the input is adjusted based on the cryptographic keys and the statistical classifier includes multiple sub-classifiers trained without the cryptographic keys. However, in such an implementation, the training may still occur with another set of cryptographic keys, or the same set of cryptographic keys.

At 210, multiple trained sub-classifiers are created by training each instance of the untrained statistical classifier using the training dataset and one or more unique cryptographic keys, optionally a single cryptographic key. Each instance is trained using a different cryptographic key, such that no two instances are trained with the same cryptographic key. Such training using the cryptographic keys may be performed, when the cryptographic key is used to adjust the respective instance of the input fed into the respective sub-classifier, or when the input is fed into the sub-classifiers without adjustment of the input by the cryptographic keys(s).

Alternatively or additionally, multiple trained sub-classifiers are created by training each instance of the untrained statistical classifier using the training dataset and the training dataset without the cryptographic keys, when the cryptographic key is used to adjust the respective instance of the input fed into the respective sub-classifier.

Optionally, the same training dataset is used to train each instance of the untrained statistical classifier. Alternatively different training datasets may be used, for example, different subsets of the training dataset.

Optionally, each of the instances of the untrained statistical classifier is iteratively trained according to an initial set of adjustable classification parameters. The initial set of adjustable classification parameters are iteratively adjusted according to the training data and according to the respective unique cryptographic key.

The adjustable classification parameters are further shifted according to the unique cryptographic key. Alternatively or additionally, the domain of the adjustable classification parameters is restricted according to the unique cryptographic key.

For example, the untrained statistical classifier is implemented as a neural network, and weights computed for each respective trained sub-classifier (i.e., sub-neural networks) using the training dataset vary according to respective unique cryptographic key(s).

Optionally, the untrained statistical classifier is implemented as a neural network. Each of the instances of the untrained neural network is iteratively trained by a unique adjustment of weights according to the unique cryptographic key and the training dataset.

Exemplary processes are now described for iterative adjustment of the adjustable classification parameters denoted Vi, for training of a certain sub-classifier denoted Mi, according to the unique cryptographic key. An initial set of the adjustable classification parameters is iteratively updated until a stop condition is met.

One exemplary process includes the steps of:

1. Computing a loss value (denoted L) as a difference between ground truth (i.e., ideal inference) and a classification output of the respective sub-classifier in response to an input of a portion of the training dataset (denoted T) (also referred to as making an inference of the portion of T). The adjustable classification parameters of the respective sub-classifier may be stored as a parameter vector.

2. Computing a direction vector (denoted $D_i$) indicative of most loss (i.e., most steep loss) of the loss value when the parameter vector shifts in the direction of the direction vector.

3. Computing a biased direction vector (denoted $D'_i$) storing a biased update to the adjustable classification parameters as a function of the direction vector $D_i$ and the respective cryptographic key (denoted $K_i$) provided to the respective instance of the untrained statistical classifier. In terms of mathematical representation, $D'_i$=Direct($K_i$, $D_i$).

4. Computing an adjusted parameter vector by adding to the current parameter vector, the biased direction vector in view of a defined learning rate (denoted E) multiplied by the biased update to adjustable classification parameters. In terms of mathematical representation, $V_i$ is adjusted to $V_i + E * D'_i$.

Exemplary implementations of $D'_i$=Direct($K_i$, $D_i$) are now described. In one implementation, the biased update to the adjustable parameter is computed as the function of the direction vector and the respective cryptographic key by computing a strong sub-set of the respective cryptographic key according to a strong requirement, and computing a weak sub-set of the respective cryptographic key according to a weak requirement. The respective cryptographic key is converted into a string of bits. The strong sub-set includes indices of the string of bits having a value of 1, and the weak sub-set includes indices of the string of bits having a value of 0.

In terms of mathematical representation, let M be the dimension of the vector $D_i$ and thus the dimension of $V_i$. Let $D_i[j]$ and $D'_i[j]$ be, respectively, the j-th element of $D_i$ and $D'_i$. The key $K_i$ separates indices $(1, \ldots, M)$ into classes.

One is strong denoted $S(K_i)$, and the other is weak denoted $W(K_i)$. Let $D'_i[j]=s\ D_i[j]$ if j is in $S(K_i)$ and $D'_i[j]=w\ D_i[j]$ if j is in $W(K_i)$. Here, $s>w$ holds.

When $K_i$ is implemented as a random string, with this randomness, a set of indices $S(K_i)$ and $W(K_i)$ are defined, both in $(1,\ldots,M)$ exclusively. For example, a pseudo-random bit string (denoted B) of the length M is generated from Ki. That is, B in $\{0,1\}^{\wedge}M$. Then let i-th index of $(1,\ldots,M)$ be in $S(K_i)$ if the i-th bit of B is 1 and be in $W(K_i)$ if the i-th bit of B is 0, based on the assumption that strong and weak are different. For example, $S=1$ and $W=0.5$.

In another implementation, the cryptographic key denotes a two dimensional matrix. The size of each of the two dimensions is according to a size of the direction vector and the parameter vector. An inner product of the parameter vector and the two dimensional vector is positive. The value of the multiplication of the parameter vector and the two dimensional vector is less than the Euclidean norm of the parameter vector. The biased direction vector is computed as a product of the two dimensional matrix and the direction vector.

In terms of mathematical representation, let M denote the dimension of the vector $D_i$ and thus the dimensions of $V_i$. Let $D_i[j]$ and $D'_i[j]$ be, respectively, the j-th element of $D_i$ and $D'_i$. The key $K_i$ specifies an M times M matrix denoted $Q_i$ such that the inner product of V and $Q_i$ V is plus and $|Q_i V|=<|V|$ for any M dimensional vector V. Rotation with degree less than 60 degree is an example. Let $D'_i=Q_i\ D_i$.

Let QS denote the space of matrix Q that satisfies the requirement. For example, Q is a rotation matrix of dimension M. Then QS denotes a set of all such matrices. Let QV denote the parameter that specifies Q in QS. Then, by using Ki, a pseudo-random bit strings denoted B is generated that is long enough to express Q in QV and projects B into QV. Q may be defined by using Ki.

Another exemplary processes for iterative adjustment of the adjustable classification parameters denoted Vi, for training of a certain sub-classifier denoted Mi, according to the unique cryptographic key, is now described. An initial value of a condition function computed according to the respective cryptographic key and the parameter vector is equal to zero. In terms of mathematical representation, initial $V_i$ satisfies the condition $Cond(K_i, V_i)=0$. The process includes the following steps:

1. Computing a loss value (denoted L) as a difference between ground truth (i.e., ideal inference) and a classification output of the respective sub-classifier in response to an input of a portion of the training dataset (denoted T) (also referred to as making an inference of the portion of T). The adjustable classification parameters of the respective sub-classifier may be stored as a parameter vector.

2. Computing a direction vector (denoted $D_i$) storing a biased update to the adjustable classification parameters indicative of most loss (i.e., most steep loss) of the loss value when the parameter vector shifts in the direction of the direction vector on the condition that the condition function computed according to the respective cryptographic key (denoted $K_i$) and the parameter vector (denoted $V_i$) added to the direction vector in view of a defined learning rate (denoted E) is equal to zero, mathematically represented as $Cond(K_i, V+E*D_i)=0$.

3. Computing an adjusted parameter vector by adding to the current parameter vector, the direction vector in view of a defined learning rate multiplied by the biased update to adjustable classification parameters. In terms of mathematical representation, $V_i$ is adjusted to $V_i+E*D_i$.

Exemplary implementations of $Cond(K_i, V_i)=0$ are now described. In one implementation, the condition function is equal to zero when a certain indexed value of the parameter vector is equal to zero. The certain indexed value of the parameter vector is equal to zero when the index is found in a subset of indices of the cryptographic key.

In terms of mathematical representation, let M denoted the dimension of the vector $D_i$ and thus the dimension of $V_i$. Let $D_i[j]$ and $V_i[j]$ be, respectively, the j-th element of $D_i$ and $V_i$. Let $Z(K_i)$ be a subset of indices $(1,\ldots,M)$. Let $V_i[j]=0$ if j is in $Z(K_i)$ if $Cond(K_i, V_i)=0$.

In another implementation of $Cond(K_i, V_i)=0$, the cryptographic key denotes a two dimensional matrix. The size of each of the two dimensions is according to a size of the direction vector and the parameter vector. The cryptographic key denotes a condition vector having a size according to the size of the direction vector and the parameter vector. A product of the two dimensional matrix and the parameter vector is equal to the condition vector when the condition function computed according to the respective cryptographic key and the parameter vector is equal to zero.

In terms of mathematical representation, Let $D_i[j]$ and $V_i[j]$ denote, respectively, the j-th element of $D_i$ and $V_i$. The key $K_i$ specifies an M times M matrix denoted $Q_i$ and M dimensional vector denoted $C_i$. Let $Q_iV_i=C_i$ if $Cond(K_i, V_i)=0$.

At 212, a set of rules is provided and/or accessed and/or defined. The set of rules is stored in association with the statistical classifier.

The set of rules defines a single classification output of the statistical classifier in response to multiple classification outputs from the trained sub-classifiers in response to input into the statistical classifier that is provided to each of the trained sub-classifiers. Additional details of the set of rules are described, for example, with reference to act 310 of FIG. 3.

At 214, the computed statistical classifier is provided, for example, stored and/or forward to another computing device. The statistical classifier includes the multiple trained sub-classifiers. The statistical classifier may include the set of rules. The statistical classifier may include organizational code for inputting data into the sub-classifiers, for obtaining outputs of the sub-classifiers, for analyzing the outputs of the sub-classifiers according to the set of rules, and/or for outputting the single classification outcome.

Optionally, a probability of computing a misclassification error by the statistical classifier in response to the input is statistically lower than a probability of computing a misclassification error by a single untrained statistical classifier trained with the training dataset and without a cryptographic key (i.e., without adapting the instances of the input according to the cryptographic keys, and/or training the classifier only according to the training dataset and without the cryptographic keys).

Referring now back to FIG. 3, at 302, one or more trained classifiers are provided and/or accessed. The classifier(s) are trained as described with reference to FIG. 2.

At 304, input (also referred to herein as a new data item) is received for classification. For example, the client terminal provides the data for classification to the trained statistical classifier, optionally stored by the computing device, optionally over the network.

The input may be authentic, for example, output of a sensor (e.g., imaging sensor) and/or provided by an authentic user. Alternatively, the input may be a fabricated input which may be created, for example, by a malicious entity with the goal of obtaining a desired classification output by the statistical classifier. The fabricated input may be generally invalid as input data (i.e., no real classification result exists) but designed to trigger a target classification result. The statistical classifier is able to distinguish between the authentic input and the fabricated input, optionally according to a defined probability threshold, as described herein.

The input may be an image, or other data structures, according to the input data format of the statistical classifier.

At 306, the input may be adjusted according to cryptographic keys.

Optionally, multiple instances of the input are created, for example, by copying the input multiple times. The number of instances of the input may correspond to the number of sub-classifiers of the statistical classifier.

Each instance of the input may be adjusted by a unique cryptographic key. Each instance of the input is adjusted by a different cryptographic key. The cryptographic keys are provided and/or computed as described with reference to act 208 of FIG. 2. The input may represented as a vector and adjusted as described herein with reference to iterative adjustment of the classification parameters during training, for example, in act 210 of FIG. 2, for example, based on one or more adjustment iterations, optionally a single iteration.

At 308, the input is provided to each of the trained sub-classifiers.

The same input may be provided to each of the trained sub-classifiers when the input is not adjusted by the cryptographic keys. When the input is adjusted by the cryptographic keys, each adjusted instance of the input is fed into a different trained sub-classifiers. When the input is adjusted by the cryptographic keys, the sub-classifiers may include sub-classifiers trained without the cryptographic keys, and/or sub-classifiers trained with the cryptographic keys.

At 310, the outputs of the trained sub-classifiers are analyzed according to a set of rules to compute a single classification output. For example, according to a majority vote and/or other sets of rules, as described herein.

The set of rules defines a single classification output of the statistical classifier in response to multiple classification outputs from the trained sub-classifiers in response to the input into the statistical classifier. The single classification output is computed according to the set of rules.

Optionally, the set of rules define selection of the single classification output according to a majority of classification outputs from the trained sub-classifiers. For example, when multiple classification types {A,B,C} are available, and there are five sub-classifiers, with 3 sub-classifiers outputting B, 1 sub-classifier outputting A, and another sub-classifier outputting C, the single classification output is designated as B. In terms of mathematical representation, the outputs denoted as $R_i$ are for i=1, . . . , N sub-classifiers. The majority value is denoted as R.

Alternatively or additionally, an indication of a degree of certainty of correct classification of the respective classification output is outputted by each respective trained sub-classifier, for example, a probability value indicative of accuracy of classification. In such a case, the set of rules define outputting an indication of likelihood of malicious manipulation when a distribution of the degrees of certainty outputted by the trained sub-classifiers is according to a requirement, for example, a defined distribution shape, a standard deviation value, an average value, and/or within a range. For example, an indication of accurate classification is outputted when the degrees of certainty are within the range of 90-95% probability. In another example, an example of an inaccurate classification (e.g., likely a forgery) is outputted when the degrees of certainty are within a wide range defined by a requirement, for example, 20%-90%.

It is noted that the indication of degree of certainty of correct classification of the respective classification output outputted by each respective trained sub-classifier may be used to detect forgeries, and/or malicious attempts at manipulation of the classifier.

It is noted that the set of rules may restrict the space of the parameter vectors. However, the space of parameters has a large redundancy as they have large symmetry. Hence, restricting its space to a certain extent does not necessarily deprive the expressiveness of the sub-classifier. Hence, during the learning process, the sequence of vectors that the of adjustable classification values (stored as parameter vector) traces during the learning, is biased depending on the cryptographic key. However, as long as the respective sub-classifier keeps learning, it learns its optimal parameter in an ideal case although it may require more steps. Hence, the described training process does not necessarily deteriorate the sub-classifier's capability of inference.

At 312, the single classification output is computed and/or outputted. Alternatively, an indication of an attempted malicious manipulation and/or forgery is outputted. The indication of the attempted malicious manipulation and/or forgery may be outputted when no single classification output may be computed according to a certainty requirement and/or when the probability of correct classification by the sub-classifiers is widely distributed (e.g., according to a requirement).

At 314, instructions are generated according to the single classification output. Optionally, the instructions are for execution by a controller, for example, code for execution by a processor(s) of the controller. Alternatively or additionally, the instructions are for manual execution by a human for manual adjustment of the controller. The manual instructions may be, for example presented on a display (e.g., text, video, animation, images) and/or played on speakers (e.g., audio instructions).

Exemplary controllers are for: an automated driving vehicle, a semi-automated driving vehicle, a security system, and an object validation system.

The instructions may be generated according to the indication of attempt of malicious manipulation and/or forgery.

At 316, optionally the generated instructions are executed and/or implemented by the controller (and/or manually by the user).

Exemplary input and associated instructions include: a driving scene (e.g., outputted by an image sensor on the vehicle) for outputting instructions for generating an alert in response to automated monitoring of the driving scene according to the classification output, a driving scene for outputting instructions for controlling an automated driving vehicle according to the classification output, and an object for automated authentication according to the classification output (e.g., real or forgery), and an environment scene for automated security of the environment according to the classification output (e.g., suspicious activity or normal activity).

When the input is a forgery and/or fabricated input, the instructions may be, for example, to call an emergency security service, to perform an emergency stop maneuver of the vehicle.

Figure 4:
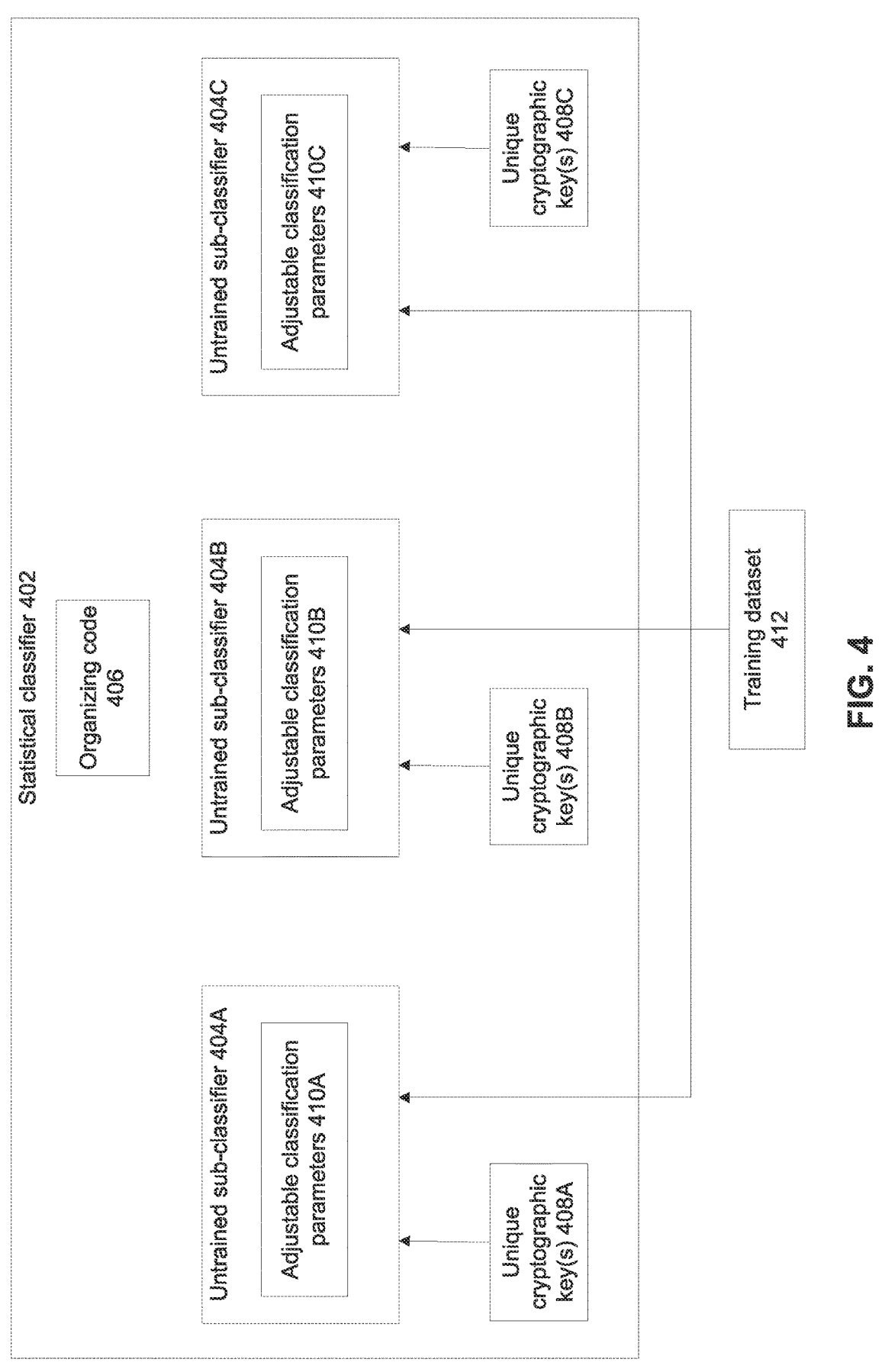
FIG. 4 is a block diagram of an exemplary architecture for training of a secure statistical classifier, including exemplary dataflow, in accordance with some embodiments of the present invention.

Reference is now made to FIG. 4, which is a block diagram of an exemplary architecture for training of a secure statistical classifier 402, including exemplary dataflow, in accordance with some embodiments of the present invention. Statistical classifier 402 may be trained based on the methods described with reference to FIG. 2, and/or by components of system 100 described with reference to FIG. 1, in accordance with some embodiments of the present invention.

Statistical classifier 402, denoted herein as M, includes multiple instances of an untrained sub-classifier 404A-C. Although 3 sub-classifiers are depicted, such number is not necessarily limiting, and two, or four or more sub-classifiers may be implemented. N denotes the number of sub-classifiers. $M_1, \ldots M_N$ denotes the sub-classifiers. Each sub-classifier 404A-C includes a set of adjustable classification parameters 410A-C, optionally represented as a vector. The adjustable classification parameter vector, denoted Vi, is for sub-classifier Mi. Statistical classifier 402 may include organizing code 406 which may perform one or more functions, as described herein.

Each sub-classifier 404A-C is trained using a respective cryptographic key 408A-C and training dataset 412 denoted T. The same training dataset or same portion thereof, or different portions of the training dataset are provided to respective sub-classifiers 404A-C for training thereof, optionally by organizing code 406. The number of cryptographic keys may be N, corresponding to the number of sub-classifiers. The cryptographic keys may be denoted $K_1, \ldots, K_N$. One unique cryptographic key may be provided per sub-classifier. In terms of mathematical representation, cryptographic key Ki is provided to sub-classifier Mi for i=1, . . . , N. The cryptographic keys may be generated and provided by organizing code 406.

Adjustable classification parameters 410A-C of respective sub-classifiers 404A-C are iteratively updated according to training dataset 412 and respective cryptographic key 408A-C, as described herein. In terms of mathematical representation, each sub-classifier $M_i$ has initial $V_i$ and learns from T where $K_i$ effects how $M_i$ learns, i.e., adjust $V_i$, from T.

In each iterative adjustment of Vi, a learning rate denoted E determines how strong the sub-classifier modifies its adjustable classification parameter vector.

Figure 5:
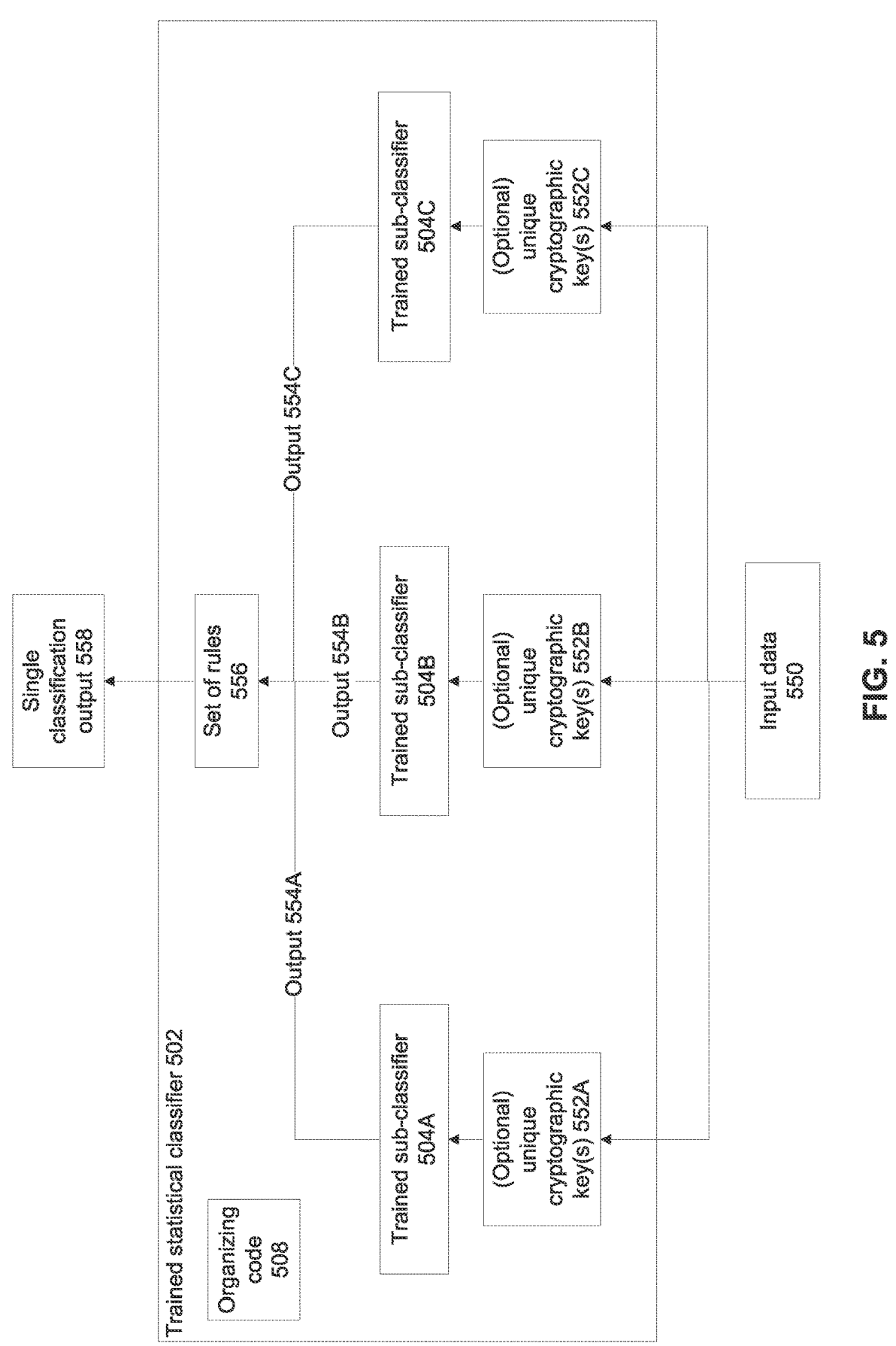
FIG. 5 is a block diagram of an exemplary architecture for classification by a trained secure statistical classifier, including exemplary dataflow, in accordance with some embodiments of the present invention.

Reference is now made to FIG. 5, which is a block diagram of an exemplary architecture for classification by a trained secure statistical classifier 502, including exemplary dataflow, in accordance with some embodiments of the present invention. Trained statistical classifier 502 may be used to classify new data based on the methods described with reference to FIG. 5, and/or by components of system 100 described with reference to FIG. 1, in accordance with some embodiments of the present invention.

Statistical classifier 502 may be implemented as statistical classifier 402 of FIG. 4, after the training process has been completed. Components of statistical classifier 502 may correspond to components of statistical classifier 402.

Statistical classifier may include organizing code 508 which may perform one or more functions, as described herein.

Statistical classifier 502, denoted herein as M, includes multiple instances of trained sub-classifiers 504A-C denoted Mi for i=1, . . . , N (three are shown as a not necessarily limiting example, as two or four or greater numbers may be used). An input data 550, denoted C, is provided for classification. Input data 550 is fed into each one of trained sub-classifiers 504A-C, optionally by organization code 508. Optionally, the same input data 550 is fed into each one of trained sub-classifiers 504A-C. Alternatively or additionally, input data 550 is adjusted by a respective unique cryptographic key 552A-C, where each unique adjusted input data is fed into a corresponding sub-classifier.

Each trained sub-classifier 504A-C outputs a respective output 554A-C, denoted Ri, optionally with a corresponding degree of uncertainty. Output 554A-C are analyzed according to a set of rules 556 to compute a single classification outcome 558 denoted R, optionally by organization code 508, as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant classifiers will be developed and the scope of the term classifier is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computing device comprising processor for a secure statistical classifier protecting against malicious manipulation of input, comprising:

at least one data storage device persistently retaining information comprising a plurality of trained sub-classifiers created by training each of a plurality of instances of an untrained statistical classifier on a sub-training dataset of a plurality of sub-training datasets, each sub-training dataset including a plurality of records, each record including:

a combined input data item generated from a combination of a training input data item of a main training dataset including a plurality of training input data items and a plurality of corresponding ground truth labels, and at least one unique cryptographic key of a plurality of cryptographic keys, and a ground truth label of the training input data item included in the combined input data item;

wherein training each of the plurality of instances of the untrained statistical classifier on the sub-training dataset comprising iteratively adjusting adjustable classification parameters of a respective instance of the untrained statistical classifier according to the combined input data item of the sub-training dataset serving as input generated from the combination of the training input data item and the at least one unique cryptographic key and a corresponding ground truth label;

wherein the secure statistical classifier includes the plurality of trained sub-classifiers and is configured to be utilized by the processor such that in response to receiving input for classification by the secure statistical classifier, the processor executes a code for computing at least one of a classification output and an indication of likelihood of malicious manipulation based on a plurality of classification outputs from the plurality of trained sub-classifiers, wherein the processor further causes execution of code instructions by a controller such that the controller controls at least one of: an automated driving vehicle, and a semi-automated driving vehicle, wherein said code instructions are generated according to at least one of the classification output and the indication of likelihood of malicious manipulation of input, and wherein each of the plurality of instances of the untrained statistical classifier is trained using a different cryptographic key.

2. The computing device according to claim 1, wherein each one of the sub-training datasets includes a same portion of the main training dataset combined with a different at least one unique cryptographic key.

3. The computing device according to claim 1, wherein the adjustable classification parameters of each trained sub-classifier have unique values computed according to a corresponding at least one unique cryptographic key of the sub-training dataset.

4. The computing device according to claim 1, wherein a probability of computing a misclassification by the secure statistical classifier in response to an input is statistically lower than a probability of computing a misclassification by a single untrained statistical classifier trained with the main training dataset and without a cryptographic key.

5. The computing device of claim 1, wherein each respective cryptographic key comprises random data generated such that a probability of randomly computing the respective cryptographic key is below a set threshold.

6. The computing device of claim 1, wherein the untrained statistical classifier comprises a neural network, and wherein weights computed for each respective trained sub-classifier using the sub-training dataset vary according to the at least one unique cryptographic key and are unique to the respective trained sub-classifier.

7. The computing device of claim 1, wherein the plurality of cryptographic keys are stored in a secure data storage device included in the at least one data storage device that denies access to non-authorized users, wherein the non-authorized users are granted access for providing input to the statistical classifier.

8. The computing device according to claim 1, wherein the at least one data storage device further comprising code for training each of the plurality of instances of the untrained statistical classifier to generate a respective sub-classifier by updating an initial set of adjustable classification parameters, including instructions for iterating the following for updating the initial set of adjustable classification parameters until a stop condition is met:

computing a loss value as a difference between a respective ground truth label and a classification output of a respective sub-classifier in response to an input of the combined input data item of the sub-training dataset, wherein the adjustable classification parameters of the respective sub-classifier are stored as a parameter vector;

computing a direction vector indicative of most loss of the loss value when the parameter vector shifts in a direction of the direction vector;

computing a biased direction vector storing a biased update to the adjustable classification parameters as a function of the direction vector and the at least one unique cryptographic key provided to a respective instance of the untrained statistical classifier; and computing an adjusted parameter vector by adding to a current parameter vector, the biased direction vector in view of a defined learning rate multiplied by the biased update to adjustable classification parameters.

9. The computing device according to claim 8, wherein the biased update to the adjustable parameter is computed as the function of the direction vector and the at least one unique cryptographic key by computing a strong sub-set of the at least one unique cryptographic key according to a strong requirement, and computing a weak sub-set of the at least one unique cryptographic key according to a weak requirement.

10. The computing device according to claim 9, wherein the at least one unique cryptographic key is converted into a string of bits, the strong sub-set includes indices of the string of bits having a value of 1, and the weak sub-set includes indices of the string of bits having a value of 0.

11. The computing device according to claim 9, wherein the at least one unique cryptographic key denotes a two dimensional matrix, where a size of each of the two dimensional matrix's dimensions is according to a size of the direction vector and the parameter vector, wherein an inner product of the parameter vector and a two dimensional vector of the two dimensional matrix and the parameter vector multiplied is positive, and a value of a multiplication of the parameter vector and the two dimensional vector is less than an Euclidean norm of the parameter vector, wherein the biased direction vector is computed as a product of the two dimensional matrix and the direction vector.

12. The computing device according to claim 1, wherein the at least one data storage device further comprising code for training each of the plurality of instances of the untrained statistical classifier to generate a respective sub-classifier by updating an initial set of adjustable classification parameters, including instructions for iterating the following for updating the initial set of adjustable classification parameters until a condition is met, wherein an initial value of a condition function computed according to the at least one unique cryptographic key and a parameter vector is equal to zero:

computing a loss value as a difference between a respective ground truth label and a classification output of a respective sub-classifier in response to an input of the combined input data item of the sub-training dataset, wherein the adjustable classification parameters of the respective sub-classifier are stored as the parameter vector;

computing a direction vector storing a biased update to the adjustable classification parameters indicative of most loss of the loss value when the parameter vector shifts in a direction of the direction vector on condition that a condition function computed according to the at least one unique cryptographic key and the parameter vector added to the direction vector in view of a defined learning rate is equal to zero; and computing an adjusted parameter vector by adding to a current parameter vector, the direction vector in view of a defined learning rate multiplied by the biased update to adjustable classification parameters.

13. The computing device of claim 12, wherein the condition function is equal to zero when a certain indexed value of the parameter vector is equal to zero, wherein the certain indexed value of the parameter vector is equal to zero when an index is found in a subset of indices of the at least one unique cryptographic key.

14. The computing device of claim 13, wherein the at least one unique cryptographic key denotes a two dimensional matrix, where a size of each of the two dimensional matrix's dimensions is according to a size of the direction vector and the parameter vector, and the at least one unique cryptographic key denotes a condition vector having a size according to the size of the direction vector and the parameter vector, wherein a product of the two dimensional matrix and the parameter vector is equal to the condition vector when the condition function computed according to the at least one unique cryptographic key and the parameter vector is equal to zero.

15. A system for protecting against malicious manipulation of input using a secure statistical classifier, comprising:

at least one hardware processor executing a code for:

receiving input for classification by a secure statistical classifier, wherein the secure statistical classifier includes a plurality of trained sub-classifiers;

providing the input to each of the plurality of trained sub-classifiers, wherein each of the plurality of trained sub-classifiers includes a respective instance of an untrained statistical classifier trained on a sub-training dataset of a plurality of sub-training datasets, each sub-training dataset including a plurality of records, each record including a combined input data item generated from a combination of a training input data item of a main training dataset and at least one unique cryptographic key of a plurality of cryptographic keys, and a ground truth label of the training input data item included in the combined input data item, by iteratively adjusting adjustable classification parameters of the respective instance of the untrained statistical classifier according to the combined input data item of the sub-training dataset serving as input generated from the combination of the training input data item and the at least one unique cryptographic key and a corresponding ground truth label, wherein the adjustable classification parameters of each trained sub-classifier have unique values computed according to the corresponding at least one unique cryptographic key of the sub-training dataset;

computing in response to a plurality of classification outputs from the plurality of trained sub-classifiers at least one of a single classification output and an indication of likelihood of malicious manipulation; and causing execution of code instructions by a controller such that the controller controls at least one of: an automated driving vehicle, and a semi-automated driving vehicle, said code instructions are generated according to at least one of the single classification output and the indication of likelihood of malicious manipulation of input;

wherein each of the respective instances of the untrained statistical classifier is trained using a different cryptographic key.

16. The system of claim 15, further comprising code for generating the code instructions for execution by the controller.

17. The system of claim 15, wherein the secure statistical classifier further includes a set of rules defining a single classification output of the secure statistical classifier in response to a plurality of classification outputs from the plurality of trained sub-classifiers in response to input into the statistical classifier that is provided to each of the plurality of trained sub-classifiers, wherein the single clas- sification output is computed according to the set of rules.

18. The system of claim 17, wherein the set of rules define selection of the single classification output according to a majority of plurality of classification outputs from the plurality of trained sub-classifiers.

19. The system of claim 17, wherein an indication of a degree of certainty of correct classification of a respective classification output is outputted by each respective trained sub-classifier, and the set of rules define outputting the indication of likelihood of malicious manipulation when a distribution of degrees of certainty per indications outputted by the plurality of trained sub-classifiers is according to a requirement.

20. A method of protecting against malicious manipulation of input using a secure statistical classifier, the method comprising:

by at least one hardware processor executing a code for:

receiving input for classification by a secure statistical classifier, wherein the secure statistical classifier includes a plurality of trained sub-classifiers;

providing the input to each of the plurality of trained sub-classifiers, wherein each of the plurality of trained sub-classifiers includes a respective instance of an untrained statistical classifier trained on a sub-training dataset of a plurality of sub-training datasets, each sub-training dataset including a plurality of records, each record including a combined input data item generated from a combination of a training input data item of a main training dataset and at least one unique cryptographic key of a plurality of cryptographic keys, and a ground truth label of the training input data item included in the combined input data item, by iteratively adjusting adjustable classification parameters of the respective instance of the untrained statistical classifier accord- ing to the combined input data item of the sub- training dataset serving as input generated from the combination of the training input data item and the at least one unique cryptographic key and a corre- sponding ground truth label, wherein the adjustable classification parameters of each trained sub-classifier have unique values computed according to the corresponding at least one unique cryptographic key of the sub-training dataset;

computing in response to the plurality of classification outputs from the plurality of trained sub-classifiers at least one of a single classification output and an indication of likelihood of malicious manipulation; and causing execution of code instructions by a controller such that the controller controls at least one of: an automated driving vehicle, and a semi-automated driving vehicle wherein said code instructions are generated according to at least one of the single classification output and the indication of likelihood of malicious manipulation of input;

wherein each of the respective instances of the untrained statistical classifier is trained using a dif- ferent cryptographic key.

* * * * *